United States Patent
Takemoto

(10) Patent No.: US 7,251,054 B2
(45) Date of Patent: Jul. 31, 2007

(54) METHOD, APPARATUS AND RECORDING MEDIUM FOR IMAGE PROCESSING

(75) Inventor: Fumito Takemoto, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 1248 days.

(21) Appl. No.: 09/748,002

(22) Filed: Dec. 27, 2000

(65) Prior Publication Data

US 2002/0018224 A1    Feb. 14, 2002

(30) Foreign Application Priority Data

Dec. 27, 1999    (JP)    ................... 11-369338
Oct. 27, 2000    (JP)    ................... 2000-329034

(51) Int. Cl.
*H04N 1/407* (2006.01)

(52) U.S. Cl. ...................... 358/1.9; 358/538

(58) Field of Classification Search ........ 358/500–501, 358/518, 520–523, 298–300, 1.9, 538; 345/589
See application file for complete search history.

(56) References Cited

U.S. PATENT DOCUMENTS

| | | | |
|---|---|---|---|
| 5,296,945 A | | 3/1994 | Nishikawa et al. |
| 5,506,946 A | * | 4/1996 | Bar et al. .................... 345/600 |
| 5,515,172 A | * | 5/1996 | Shiau ......................... 358/520 |
| 5,544,284 A | * | 8/1996 | Allebach et al. ............ 345/603 |
| 6,377,269 B1 | * | 4/2002 | Kay et al. ................... 345/589 |

FOREIGN PATENT DOCUMENTS

| | | |
|---|---|---|
| JP | 2878855 | 2/1991 |
| JP | 05-300351 A | 11/1993 |
| JP | 8221546 | 2/1995 |
| JP | 07234933 A * | 9/1995 |
| WO | WO 98/56167 A1 | 12/1998 |

OTHER PUBLICATIONS

"Photoshop for Windows," Tsinghua University Press, 1996.

* cited by examiner

*Primary Examiner*—Thomas D. Lee
*Assistant Examiner*—Stephen Brinich
(74) *Attorney, Agent, or Firm*—Birch, Stewart, Kolasch & Birch, LLP

(57) ABSTRACT

The color and tone of an image of an object are changed to a color and tone desired by a user. Image data including an image of an object is input to image processing means and displayed on a monitor. The user observes the image displayed on the monitor and selects an area including an image of an object having the desired color and tone, and an area including the image of an object whose color and tone are to be changed to the desired color and tone. The image processing means extracts color pixels from each respective specified area and generates cumulative histograms of the color pixels as characteristic quantitative data representing the color and tone. Based on the cumulative histograms, the color-tone of the area including the image of the latter object is changed, and processed image data whose color and tone have been changed is obtained.

20 Claims, 8 Drawing Sheets

METHOD, APPARATUS AND RECORDING MEDIUM FOR IMAGE PROCESSING

BACKGROUND OF THE INVENTION

1. Field of the Invention

The present invention relates to an image processing method and an image processing apparatus for changing a color and a tone in a specific area included in a color image. The present invention also relates to a computer-readable recording medium storing a program to cause a computer to execute the image processing method.

2. Description of the Related Art

Reproduction of digital image data obtained by digital still cameras (hereinafter referred to as a digital camera) and digital image data obtained by reading images recorded on film has been carried out to generate hard copies such as prints, or soft copies on display screens. In such reproduction of digital image data, a reproduced image is expected to have as high a quality as a photograph printed from a film negative.

Color reproducibility of the same person's face can vary between prints. Furthermore, in an image including a plurality of people, color reproducibility of each person's face can be different, depending on the intensity or position of a light source. In the case of an image including a person obtained by photographing, the face of the person attracts the most attention. In order to generate a high-quality photograph, correction of the face so as to have an adequate skin color is necessary. To accomplish this, various methods of changing a skin color of an image to a preferable skin color, for example by using a display means such as a monitor and a mouse have been developed. One such method comprises the steps of using a mouse to extract pixels of skin color from an image including a person's face and changing the skin color value to a color and tone of a predefined preferable skin color value using the extracted color value as reference (Japanese Patent No. 2878855, for example). A second proposed method comprises the steps of specifying an area of color to be changed contained within a displayed image, specifying the color nearest to the most preferable color for the area in which the change is desired, upon which the color of the area is changed to a pre-defined color (Japanese Unexamined Patent Publication No. 8(1996)-221546). Furthermore, in a third proposed method, the areas containing human faces are automatically extracted and the color of the areas containing faces is changed to a predefined color.

However, in all the methods described above, because the skin color of a human face is changed to a predetermined skin color, the human face does not necessarily have a preferable skin color after the change. Furthermore, since only the face color is changed, a sharp-contrast face of a person in an image obtained by photographing outdoors in sunny weather cannot be corrected.

SUMMARY OF THE INVENTION

The present invention has been conceived in consideration of the above described problems. An object of the present invention is therefore to provide an image processing method and an image processing apparatus which can change a specific area in an image such as a human face to a preferable color and tone (hereinafter, the color and tone are together referred to as the color-tone), and to provide a computer-readable recording medium storing a program to cause a computer to execute the image processing method.

An image processing method of the present invention comprises the steps of:

receiving specification of a first area having a desired color-tone in a displayed image;

receiving specification of a second area in the image or in another image; and changing a color-tone of a desired area including the second area into the color-tone of the first area.

In the step of receiving the specification of the first area, not only one area but also a plurality of areas may be specified.

The "desired area including the second area" can refer to not only the entire second area, but also a specific area in the second area, the entire image including the second area, as well as areas comprising the second area and another area.

Furthermore, the specification of the first area may precede the specification of the second area, or vice versa.

Any object can be specified as a first or second area, for example, a human face, the sky, or green foliage.

An image processing apparatus of the present invention comprises:

display means for image display;

area specification means for specifying a first area having a desired color-tone in an image displayed on the display means and a second area in the image or in another image; and conversion means for converting a color-tone of a desired area including the second area into the color-tone of the first area.

The image processing method of the present invention may be provided as a program stored in a computer-readable recording medium to cause a computer to execute the image processing method.

According to the present invention, a first area having the desired color-tone in the displayed image is specified, and a second area in the image including the first area or in another image is specified. The color-tone of the desired area including the second area is converted into the color-tone of the first area. Thereby, the desired area including the second area can be changed to have the color-tone desired by a user.

DESCRIPTION OF THE PREFERRED EMBODIMENT

Hereinafter, an embodiment of the present invention will be explained with reference to the accompanying drawings.

Figure 1:
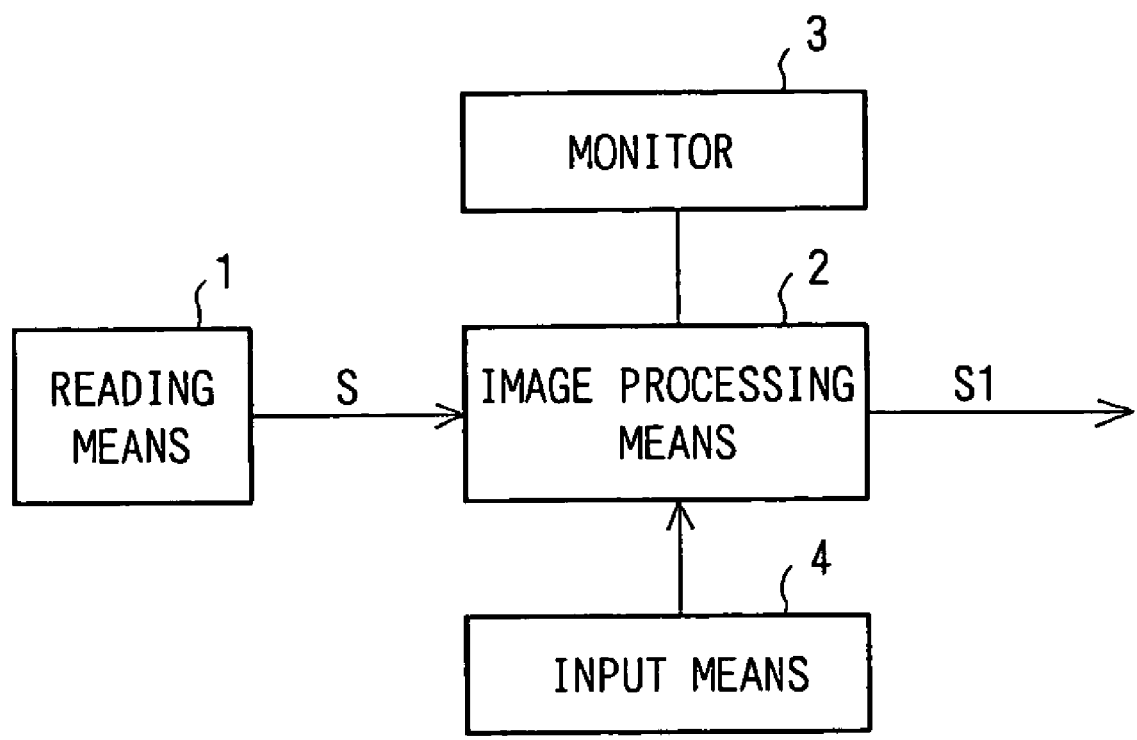
FIG. 1 is a block diagram showing a configuration of an image processing apparatus according to an embodiment of the present invention.

FIG. 1 is a block diagram showing a configuration of an image processing apparatus according to the first embodiment of the present invention. As shown in FIG. 1, the image processing apparatus obtains processed image data S1 by carrying out image processing on image data S obtained by photographing using a digital camera, reading an image with a scanner, or another means. The image processing apparatus comprises reading means 1 for reading the image data S from a recording medium or for reading the image data S transferred via a network, image processing means 2 for carrying out the image processing on the image data S, a monitor 3 for displaying the image data S, and input means 4 comprising a keyboard and a mouse for carrying out various inputs to the image processing means 2. In this embodiment, the case of changing a color-tone of a human face in an image is explained.

Figure 2:
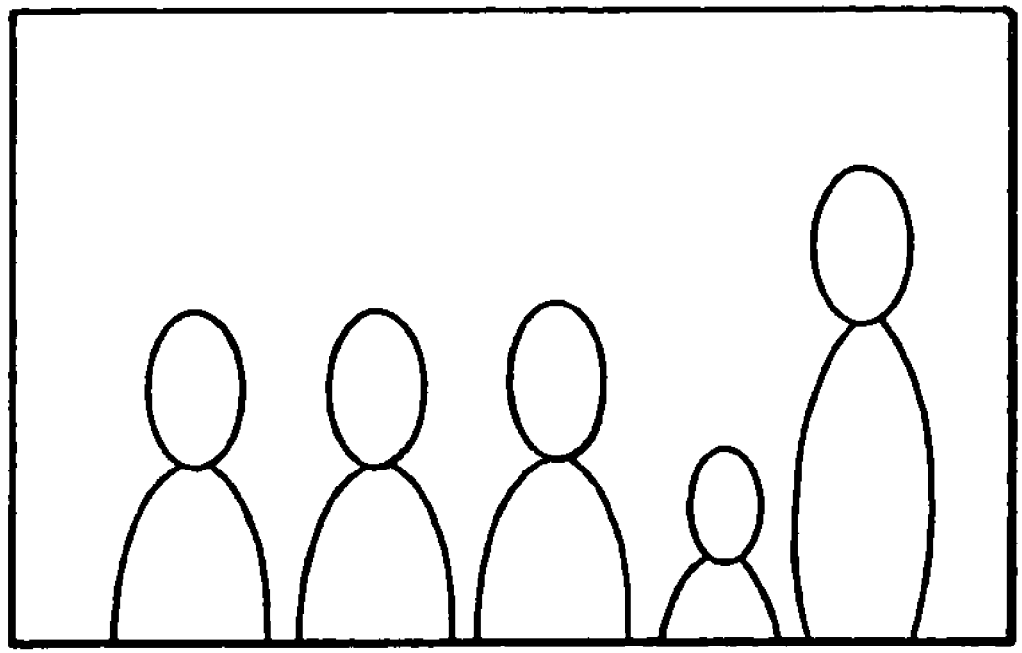
FIG. 2 shows an image displayed on a monitor.
Figure 3:
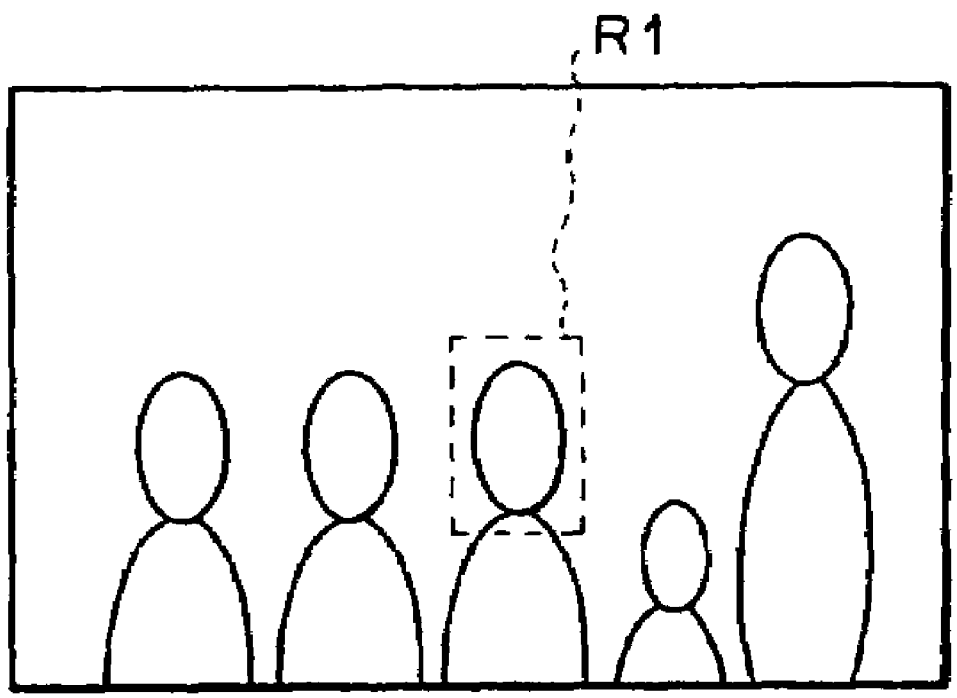
FIG. 3 shows the image in which an area R1 has been specified.

The image processing means 2 carries out the image processing on the image data S in the following manner. First, the image data S is displayed on the monitor 3. FIG. 2 shows the image displayed on the monitor 3. As shown in FIG. 2, the image including people's faces is displayed on the monitor 3. A user observes the image displayed on the monitor 3 and specifies the image of a face having the most preferable color-tone by using the input means 4. More specifically, the user specifies the image of a face having a desired color-tone by surrounding the image of the face with a rectangle by using the mouse of the input means 4. FIG. 3 shows a state in which the image of a face having a desired color-tone has been specified. As shown in FIG. 3, the image of a face having a desired color-tone is specified by a rectangular area R1.

Figure 4:
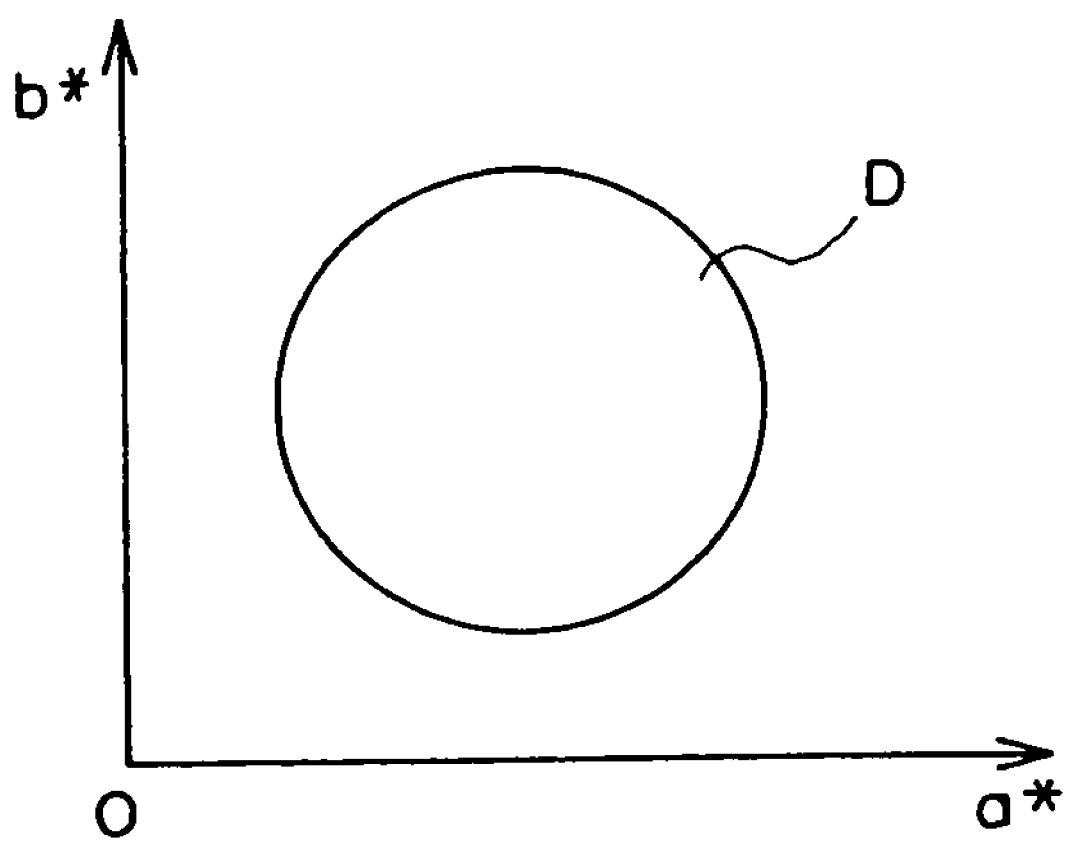
FIG. 4 is a diagram showing a skin-color range in a CIELAB color space.

After the area R1 has been specified in the above manner, the image processing means 2 extracts from the area R1 an area R1 containing pixels within a predefined skin-color range. For this extraction, a skin-color range D circled in a CIELAB color space shown in FIG. 4 is predefined and pixel values of the image contained in the area R1 are converted into the CIELAB color space. Pixels having pixel values within the skin-color range D are then extracted as the skin-color area R1'.

Figure 5:
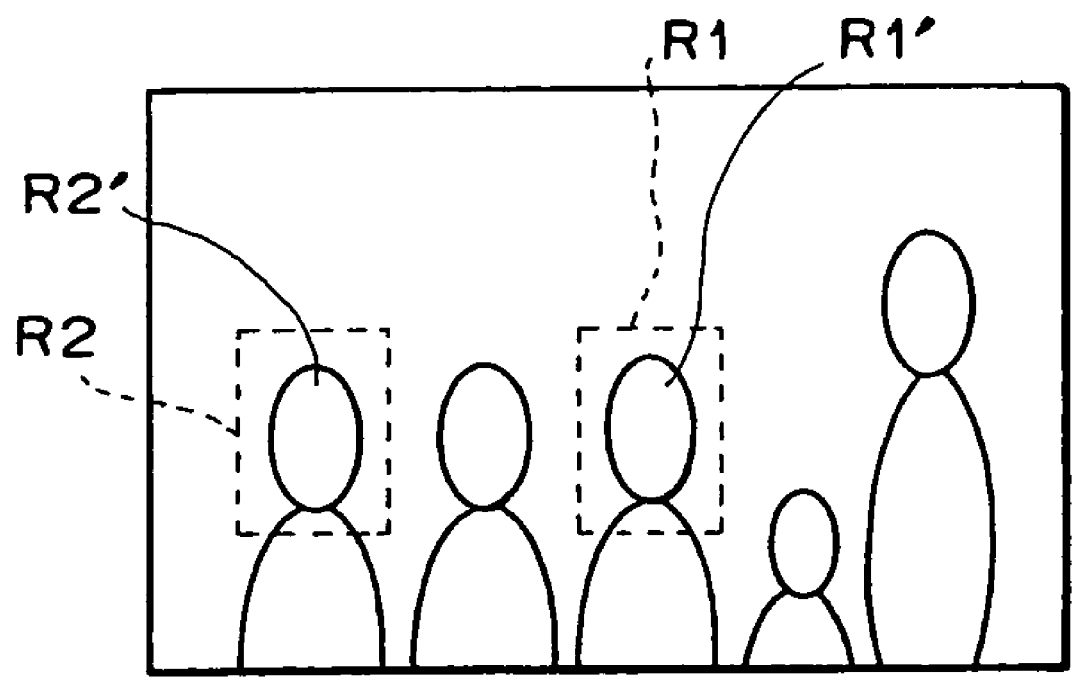
FIG. 5 is the image in which an area R2 has been specified.

The user specifies, as an area R2, an area including an image of a face whose color-tone is to be changed to the color-tone of the image of the face in the area R1. This specification is carried out in the same manner as in the specification of the rectangular area R1. FIG. 5 shows a state in which the area R2 has been specified in addition to the area R1. After the area R2 has been specified in the above manner, a skin-color area R2' in the area R2 is extracted as in the case of the area R1'.

Figure 6:
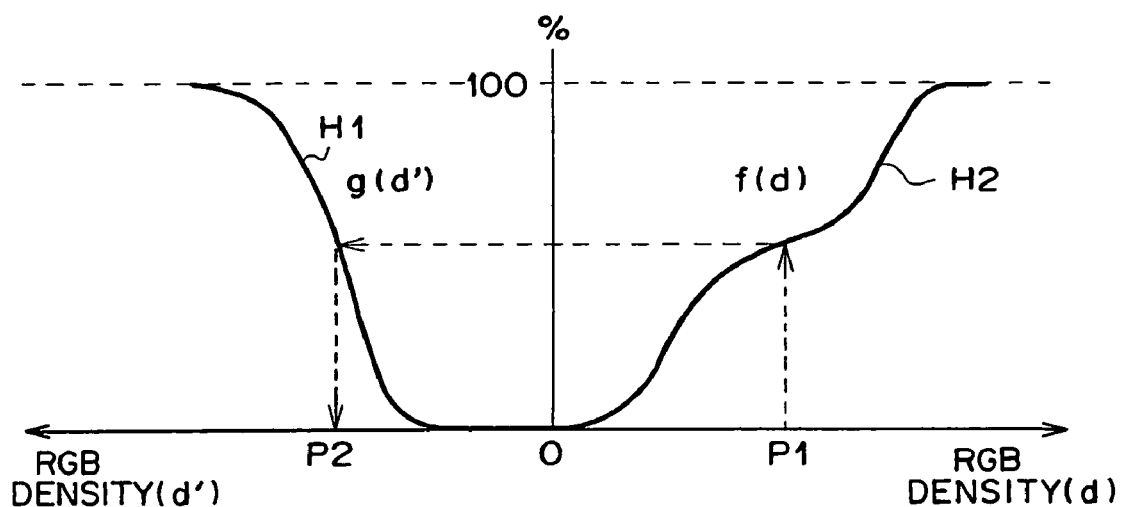
FIG. 6 shows cumulative histograms.

After the skin-color areas R1' and R2' have been extracted, cumulative histograms of the skin-color areas R1' and R2' are generated. FIG. 6 shows cumulative histograms H1 and H2 of the skin-color areas R1' and R2', respectively. In FIG. 6, the farther the horizontal axes in the cumulative histograms H1 and H2 go toward the left and toward the right from the origin, the larger RGB densities become. For cases in which the image data S comprises data of RGB colors, the cumulative histograms H1 and H2 are generated for each color. For simplicity, one set of RGB data comprising the data of RGB colors are assumed and the cumulative histograms H1 and H2 are generated from the RGB data. The cumulative histograms H1 and H2 represent characteristics of the color-tone in the skin-color areas R1' and R2', respectively. Hereinafter, these characteristics are referred to as characteristic quantities.

After the cumulative histograms H1 and H2 are generated in the above manner, color-tone conversion processing to cause the color-tone of the skin-color area R2' to become the color-tone of the skin-color area R1' is carried out based on the cumulative histograms H1 and H2. This color-tone conversion processing is carried out by relating the cumulative histogram H1 with the cumulative histogram H2 as shown by dashed lines in FIG. 6 and by changing the color-tone of the skin-color area R2' so as to cause a pixel value whose RGB density is P1 in the cumulative histogram H2 to have an RGB density P2. Let a function representing the cumulative histogram H1 be g(d') and let a function representing the cumulative histogram H2 be f(d). The processing shown by the dashed lines in FIG. 6 can be expressed by Equation (1) below:

$$d' = g^{-1}(f(d)) \quad (1)$$

If only the color-tone of the skin-color area R2' is changed, a boundary thereof looks unnatural. Therefore, it is preferable for the color-tone to be changed gradually at the boundary.

Figure 7:
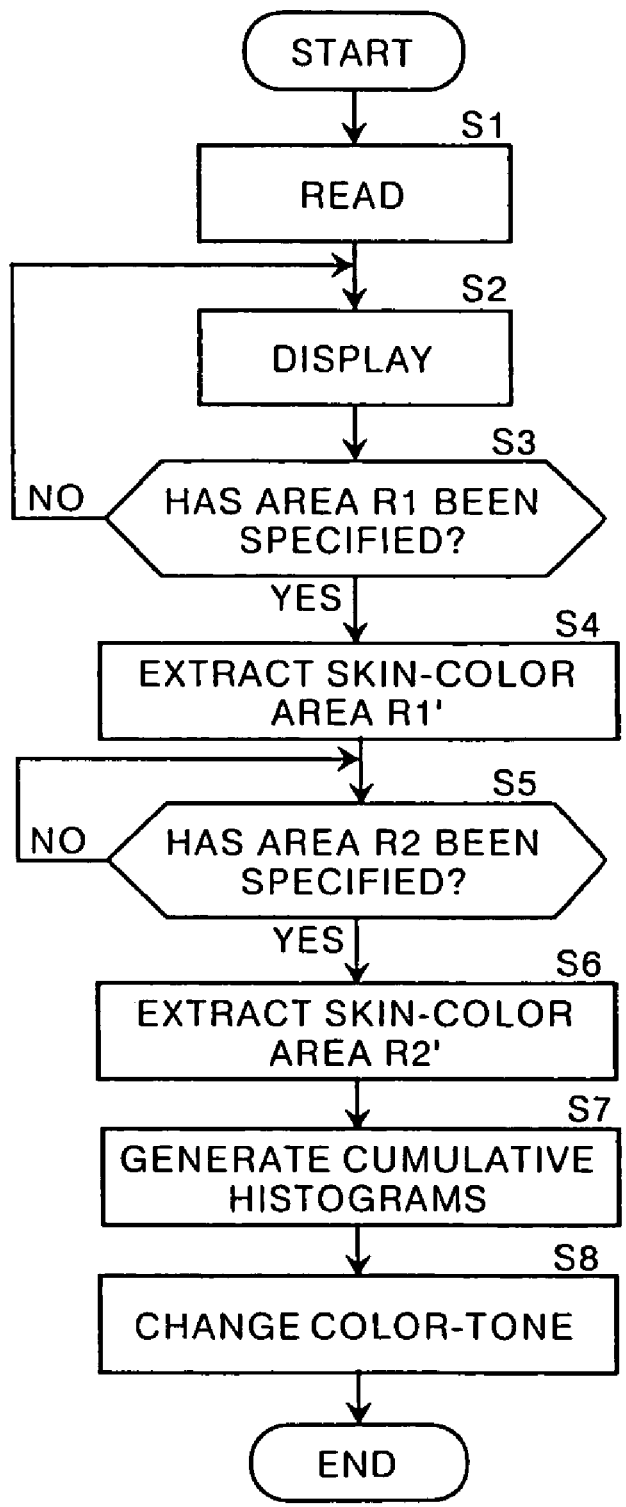
FIG. 7 is a flow chart showing operation of the embodiment.

Operation of the first embodiment will be explained next. FIG. 7 is a flow chart showing the operation of this embodiment. The image data S are read and input to the image processing means 2 (Step S1). The image data S input to the image processing means 2 are displayed on the monitor 3 (Step S2). The user observes the image displayed on the monitor 3 and specifies the area R1 including the image of a face having the desired color-tone. The user inputs completion of the specification by using the input means 4 (Step S3). After the completion of the area R1, the skin-color area R1' included in the area R1 is extracted (Step S4).

Meanwhile, the user specifies the area R2 including the image of a face whose color-tone is to be changed to become the same as the color-tone of the area R1 while viewing the image displayed on the monitor 3, and completes input of specification of the area R2 from the input means 4 (Step S5). After completion of the specification of the area R2, the skin-color area R2' included in the area R2 is extracted (step S6).

After the extraction of the skin-color areas R1' and R2', the cumulative histograms H1 and H2 of the skin-color areas R1' and R2' are generated (Step S7). Based on the cumulative histograms H1 and H2, the color-tone of the skin-color area R2' is changed to become the color-tone of the skin-color area R1' according to Equation (1), and the processed image data SI are obtained (Step S8) to end the procedure.

As has been described above, in this embodiment, the area R1 having the desired color-tone is specified and the color-tone of the area R2 is changed to become the color-tone of the face image in the area R1. Therefore, the skin-color area R2' in the area R2 can be changed to have the color-tone desired by the user.

In the above embodiment, the color-tone of only the skin-color area R2' in the area R2 is changed. However, a color-tone of the entire area R2 may be changed. Alternatively, a color-tone of a predetermined area including the area R2 or the entire image displayed on the monitor 3 (excluding the area R1) may be changed.

In the above embodiment, the area R2 is specified in the image in which the area R1 has been specified. However, the area R2 may be specified in an image different from the image having the area R1.

Figure 8:
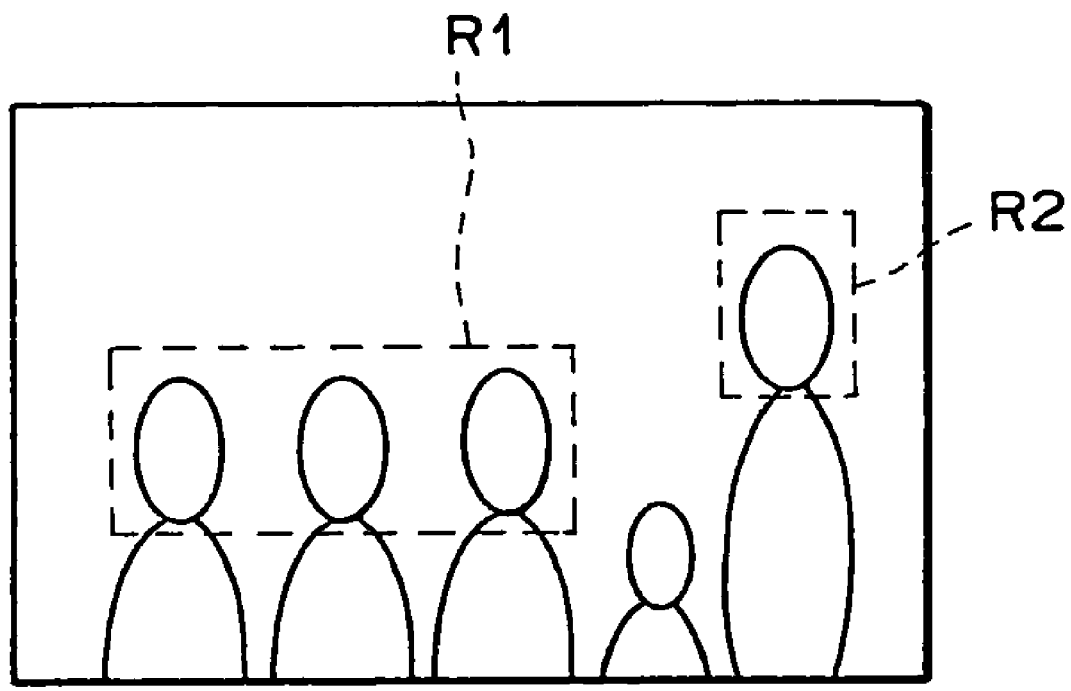
FIG. 8 shows an image in which a plurality of faces have been specified as area R1.

Furthermore, in the above embodiment the image of a face having a desired color-tone is specified as the area R1. However, for cases in which there are a plurality of images of faces having a desired color-tone, the area R1 may be specified so as to include the all of said images of faces. For example, in the image having people's faces as shown in FIG. 2, if face images of three people from the left have a desired color-tone, the area R1 is specified so as to include the face images of the three people, as shown in FIG. 8.

Therefore, an image of a face whose color-tone is to be changed to the color-tone of the face images in the area R1 is the face image on the right, and this face image is specified by the area R2. In this case, as in the above embodiment, a skin-color area R1' corresponding to the images of the faces of the three people in the area R1 is extracted and a cumulative histogram H1 is generated for the skin-color area R1' that has been extracted. Based on the cumulative histogram H1 and a cumulative histogram H2 of a skin-color area R2' in the area R2 including the image of the face on the right, the color-tone of the skin-color area R2' is changed as in the embodiment described above.

In the above embodiment, the first and second areas R1 and R2 are specified as the rectangular areas. However, the areas may be specified as areas having any shape.

In the above embodiment, characteristic quantities of the color-tone of the skin-color areas R1' and R2' in the areas R1 and R2 are represented by the cumulative histograms H1 and H2, which is not necessarily limited to these histograms.

In the above embodiment, the color-tone of the image of a face is changed. However, an area R1 having a desired color-tone of the sky, green foliage or the like may be specified in an image so that a color-tone of another area R2 is changed to have the same color-tone of the area R1.

In addition, all of the contents of Japanese Patent Application Nos. 11(1999)-369338 and 2000-329034 are incorporated into this specification by reference.

What is claimed is:

1. An image processing method, comprising the steps of:
   receiving specification of a first area having a desired color-tone in a displayed image;
   receiving specification of a second area in the image or in another image; and
   changing a color-tone of a desired area including the second area into the color-tone of the first area while gradually changing the color tone at a border of the second area.

2. The image processing method of claim 1, wherein the step of changing the color-tone of the desired area including the second area includes:
   obtaining cumulative histograms of the first area and the second area; and
   correlating the cumulative histogram of the first area and the cumulative histogram of the second area.

3. The image processing method of claim 1, wherein the step of changing the color-tone of the desired area including the second area includes changing the color-tone of a skin color area included in the second area to the color-tone of a skin color included in the first area.

4. The image processing method of claim 1, wherein the first area includes a plurality of facial areas.

5. The image processing method of claim 1, wherein the desired area that includes the second area is one of an entirety of the second area, a specific area within the second area, an entirety of an image that includes the second area, and an area comprising the second area and other areas.

6. The image processing method of claim 1, wherein the color tone at the border of the second area is gradually chanced such that a transition of the color tone of the second area from the border of the second area to the desired color tone is gradual.

7. The image processing method of claim 1, further comprising:
   extracting a first skin-color area within the first area, after receiving the specification of the first area; and
   setting the desired color-tone as a color tone of the first skin-color area of the first area,
   wherein the first skin-color area is an area within the first area with a color-tone that is within a predefined skin-color range.

8. An image processing apparatus, comprising:
   display means for image display;
   area specification means for specifying a first area having a desired color-tone in an image displayed on the display means and a second area in the image or in another image; and
   conversion means for converting a color-tone of a desired area including the second area into the color-tone of the first area while gradually changing the color tone at a border of the second area.

9. The image processing apparatus of claim 8, wherein the conversion means are configured to:
   obtain cumulative histograms of the first area and the second area; and
   correlate the cumulative histogram of the first area and the cumulative histogram of the second area.

10. The image processing apparatus of claim 8, wherein the conversion means are configured to change the color-tone of a skin color area included in the second area to the color-tone of a skin color included in the first area.

11. The image processing apparatus of claim 8, wherein the first area includes a plurality of facial areas.

12. The image processing apparatus of claim 8, wherein the desired area that includes the second area is one of an entirety of the second area, a specific area within the second area, an entirety of an image that includes the second area, and an area comprising the second area and other areas.

13. The image processing apparatus of claim 8, wherein the conversion means gradually changes the color tone at the border of the second area such that a transition of the color tone of the second area from the border of the second area to the desired color tone is gradual.

14. The image processing apparatus of claim 8,
   wherein the area specification means extract a first skin-color area within the first area, after specifying the first area, and set the desired color-tone as a color tone of the first skin-color area of the first area, and
   wherein the first skin-color area is an area within the first area with a color-tone that is within a predefined skin-color range.

15. A computer-readable recording medium storing a computer program to cause a computer to execute the procedures of:
   receiving specification of a first area having a desired color-tone in a displayed image;
   receiving specification of a second area in the image or in another image; and
   changing a color-tone of a desired area including the second area into the color-tone of the first area while gradually changing the color tone at a border of the second area.

16. The computer-readable recording medium of claim 15, wherein the procedure of changing the color-tone of the desired area including the second area includes:
   obtaining cumulative histograms of the first area and the second area; and
   correlating the cumulative histogram of the first area and the cumulative histogram of the second area.

17. The computer-readable recording medium of claim 15, wherein the procedure of changing the color-tone of the desired area including the second area includes changing the color-tone of a skin color area included in the second area to the color-tone of a skin color included in the first area.

18. The computer-readable recording medium of claim 15, wherein the first area includes a plurality of facial areas.

19. The computer-readable recording medium of claim 15, wherein the desired area that includes the second area is one of an entirety of the second area, a specific area within the second area, an entirety of an image that includes the second area, and an area comprising the second area and other areas.

20. The computer-readable recording medium of claim 15, wherein the procedure of gradually changing the color tone at the border of the second area changes the color tone such that a transition of the color tone of the second area from the border of the second area to the desired color tone is gradual.

* * * * *